US012641474B2

(12) United States Patent
Chen et al.

(10) Patent No.: US 12,641,474 B2
(45) Date of Patent: May 26, 2026

(54) METHOD AND DEVICE FOR QUALITY OF SERVICE IN WIRELESS COMMUNICATIONS

(71) Applicant: APOGEE NETWORKS, LLC, Dallas, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 328 days.

(21) Appl. No.: 18/136,882

(22) Filed: Apr. 20, 2023

(65) Prior Publication Data
US 2023/0345293 A1 Oct. 26, 2023

(30) Foreign Application Priority Data

Apr. 25, 2022 (CN) .......................... 202210441060.1

(51) Int. Cl.
*H04W 28/02* (2009.01)
(52) U.S. Cl.
CPC ............................... *H04W 28/0268* (2013.01)
(58) Field of Classification Search
None
See application file for complete search history.

(56) References Cited

U.S. PATENT DOCUMENTS

| | | | | |
|---|---|---|---|---|
| 2016/0277272 A1* | 9/2016 | Peach | ................. | H04L 43/0858 |
| 2023/0247476 A1* | 8/2023 | Chun | ................. | H04L 65/1073 |
| | | | | 370/235 |

OTHER PUBLICATIONS

Third Generation Partnership Project, "Technical Specification Group Radio Access Network; NR; Physical channels and modulation (Release 17)," 3GPP TS 38.211 V17.1.0 (Dec. 2022).
Third Generation Partnership Project, "Technical Specification Group Radio Access Network; NR; Multiplexing and channel coding (Release 17)," 3GPP TS 38.212 V17.1.0 (Mar. 2022).
Third Generation Partnership Project, "Technical Specification Group Radio Access Network; NR; Physical layer procedures for control (Release 17)," 3GPP TS 38.213 V17.1.0 (Mar. 2022).
Third Generation Partnership Project, "Technical Specification Group Radio Access Network; NR; Physical layer procedures for data (Release 17)," 3GPP TS 38.214 V17.1.0 (Mar. 2022).

(Continued)

*Primary Examiner* — Saad Khawar
(74) *Attorney, Agent, or Firm* — Volpe Koenig

(57) ABSTRACT

The present application discloses a method and a device for wireless communications, comprising: transmitting a first data block; QoS information of the first data block being used for the action of transmitting a first data block; herein a first data block set comprises the first data block and a second data block; any data block comprised in the first data block set is linked with a first QoS flow; the QoS information of the first data block is different from QoS information of the second data block; the QoS information of the first data block comprises a delay requirement; and the QoS information of the second data block comprises a delay requirement; any data block in the first data block set is generated by a same protocol layer. With the QoS information the present application offers the transmission flexibility for more diverse and complicated services.

19 Claims, 6 Drawing Sheets

(56)           References Cited

OTHER PUBLICATIONS

Third Generation Partnership Project, "Technical Specification Group Radio Access Network; NR; NR and NG-RAN Overall Description; Stage 2 (Release 17)," 3GPP TS 38.300 V17.0.0 (Mar. 2022).
Third Generation Partnership Project, "Technical Specification Group Radio Access Network; NR; Radio Resource Control (RRC) protocol specification (Release 17)," 3GPP TS 38.331 V17.0.0 (Mar. 2022).

* cited by examiner

100

| Identity for indicating quality | Resource type | (Default) Priority | PDB | Packet Error Rate | (Default) Maximum Data Burst Volume | (Default) Averaging Window |
|---|---|---|---|---|---|---|
| 1 | GBR | 20 | 100 ms | $10^{-2}$ | N/A | 2000 ms |
| 2 | | 40 | 150 ms | $10^{-3}$ | N/A | 2000 ms |
| 3 | | 30 | 50 ms | $10^{-3}$ | N/A | 2000 ms |
| 4 | | 50 | 300 ms | $10^{-6}$ | N/A | 2000 ms |
| 5 | Non-GBR | 10 | 100 ms | $10^{-6}$ | N/A | N/A |
| 6 | | 60 | 300 ms | $10^{-6}$ | N/A | N/A |
| 7 | | 70 | 100 ms | $10^{-3}$ | N/A | N/A |
| 8 | | 80 | 300 ms | $10^{-6}$ | N/A | N/A |
| 9 | | 90 | | | | |

METHOD AND DEVICE FOR QUALITY OF SERVICE IN WIRELESS COMMUNICATIONS

CROSS REFERENCE TO RELATED APPLICATIONS

This application claims the priority benefit of Chinese Patent Application No. 202210441060.1, filed on Apr. 25, 2022, the full disclosure of which is incorporated herein by reference.

BACKGROUND

Technical Field

The present application relates to transmission methods and devices in wireless communication systems concerning the enhancement of Quality of Services (QoS) and interactive traffic transmission, and in particular to a method and a device for XR services.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In communications, both Long Tenn Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increase, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications, of which the details can refer to:
https://www.3gpp.org/ftp/Specs/archive/38_series/
   38.211/38211-g60.zip
https://www.3gpp.org/ftp/Specs/archive/38_series/
   38.213/38213-g60.zip
https://www.3gpp.org/ftp/Specs/archive/38_series/
   38.331/38331-g60.zip
https://www.3gpp.org/ftp/Specs/archive/38_series/
   38.331/38323-g60.zip

SUMMARY

As an important concept in communication systems, the Quality of Service (QoS) needs to be guaranteed for any kind of communication system. Some services have relatively loose QoS requirements, but some may have more stringent QoS requirements and an extra mechanism will be required to guarantee these services, such as XR services. The XR services, including VR service, AR service and CG service which are featured with high rate and low delay, are also interactive services that are demanding on the time of response of services, for instance, the information of gestures of a user is conveyed to a server, and the images reflected by the server need to be screened on the user's terminal in a very short time, otherwise, the user will sense an obvious delay and the user experience will be influenced. An XR service contains all kinds of data, like videos, audios or data used for controlling various sensors, which may be partially dependent on each other. For example, when receiving only a video targeted at the left eye but not receiving a video targeted at the right eye, such transmission will be insufficient for satisfying the requirement, and it may be assumed in conventional service transmission that at least half of data has been received, while in XR services receiving the video only for the left eye may be senseless. Such mutually associated data constitute a set of data that need to be processed as a whole. The data in need of processing altogether can be a flow. In 5G, the lowest granularity of QoS is a QoS flow, a QoS flow being configured with a group of QoS parameters, where these QoS parameters undoubtedly indicate QoS characteristics. These QoS characteristics, such as a delay requirement, are applicable to each data block of a QoS flow, for instance, if the delay requirement is 50 ms, the delay requirement of each data block of the QoS flow is 50 ms. But as a group of data that need to be processed in collaboration, the data comprised in the group are various, hence the difference between QoS requirements. For instance, a group of data shall be processed as a whole at a time t0, however, some data may have arrived at a time t0-x and others at a time t0-y, apparently, if t0 is considered as an end time, the above data will have different requirements for transmission delay. If dividing the data into groups and bearing them through many flows, the system will be sophisticated, moreover, current servers for many application layers are still incapable of doing so. Therefore, how to support more detailed QoS requirements based on the existing QoS architecture is an issue that needs to be solved.

To address the problem presented above, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

transmitting a first data block; Quality of Service (QoS) information of the first data block being used for the action of transmitting a first data block;

herein, a first datablock set comprises the first datablock and a second datablock; any datablock comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, a problem to be solved in the present application includes: how to satisfy different QoS requirements for different data blocks of a QoS flow, namely, how to support differential QoS requirements posed on different data blocks associated with a QoS flow.

In one embodiment, an advantage of the above method includes: different data blocks of a QoS flow have different QoS information, which provides higher flexibility and better supports more diversified service types.

Specifically, according to one aspect of the present application, the first data block is generated by a PDCP layer or a protocol layer above the PDCP layer.

Specifically, according to one aspect of the present application, transmitting a second data block set, the second data block set comprising at least one data block, and the second data block set being linked with a second QoS flow; QoS information of any two data blocks in the second data block set are identical, and a QoS parameter of the second QoS flow is used to determine QoS information of any data block in the second data block set; any data block in the second data block set is generated by a same protocol layer.

Specifically, according to one aspect of the present application, transmitting first information, the first information being used to indicate that the first data block belongs to the first data block set.

Specifically, according to one aspect of the present application, receiving second information, the second information being used to determine that the first data block belongs to the first data block set.

Specifically, according to one aspect of the present application, a first parameter set is used to determine QoS information of the first data block.

Specifically, according to one aspect of the present application, receiving third information, the third information being used to indicate at least one parameter in the first parameter set.

Specifically, according to one aspect of the present application, the first parameter set comprises a QoS parameter of the first QoS flow.

Specifically, according to one aspect of the present application, the first parameter set comprises a first parameter, the first parameter being neither a QoS parameter of the first QoS flow nor a QoS characteristic of the first QoS flow.

Specifically, according to one aspect of the present application, the first parameter set comprises a number of data blocks comprised in the first data block set.

Specifically, according to one aspect of the present application, the first parameter set comprises an arriving time of the first data block and an arriving time of the second data block.

Specifically, according to one aspect of the present application, the first parameter set comprises first time information and second time information, the first time information and the second time information being respectively for the first data block and the second data block, and the first time information and the second time information being different.

Specifically, according to one aspect of the present application, the first parameter set comprises QoS information of the second data block.

Specifically, according to one aspect of the present application, receiving a first candidate identifier set, where each candidate identifier in the first candidate identifier set is linked with a delay requirement;

herein, the first parameter set comprises a candidate identifier in the first candidate identifier set.

Specifically, according to one aspect of the present application, the QoS information of the first data block comprises a priority, and the QoS information of the second data block comprises a priority; the priority of the first data block and the priority of the second data block are different; the priority of one of the first data block and the second data block is equal to a priority indicated by a QoS parameter of the first QoS flow or by a QoS characteristic of the first QoS flow.

Specifically, according to one aspect of the present application, the action of transmitting a first data block comprises: mapping the first data block to radio bearers (RBs) in a first radio bearer set according to the QoS information of the first data block; the first radio bearer set comprises at least two RBs.

Specifically, according to one aspect of the present application, transmitting a first measurement report, the first measurement report comprising a delay report of the first data block set, where QoS information of respective data blocks in the first data block set are used together for generating the delay report of the first data block set.

Specifically, according to one aspect of the present application, receiving fourth information, the fourth information indicating that there exists dependency between the first data block and the second data block.

Specifically, according to one aspect of the present application, the first node is a terminal of Internet of Things (IoT).

Specifically, according to one aspect of the present application, the first node is a relay.

Specifically, according to one aspect of the present application, the first node is a base station.

Specifically, according to one aspect of the present application, the first node is an access-network device.

Specifically, according to one aspect of the present application, the first node is a vehicle-mounted terminal.

Specifically, according to one aspect of the present application, the first node is an aircraft.

Specifically, according to one aspect of the present application, the first node is a cellphone.

Specifically, according to one aspect of the present application, the first node is a communication terminal supporting multi-SIM communications.

The present application provides a method in a second node for wireless communications, comprising:

receiving a first data block; Quality of Service (QoS) information of the first data block being used for transmitting the first data block;

herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

Specifically, according to one aspect of the present application, the first data block is generated by a PDCP layer or a protocol layer above the PDCP layer.

Specifically, according to one aspect of the present application, receiving a second data block set, the second data block set comprising at least one data block, and the second data block set being linked with a second QoS flow; QoS information of any two data blocks in the second data block set are identical, and a QoS parameter of the second QoS flow is used to determine QoS information of any data block in the second data block set; any data block in the second data block set is generated by a same protocol layer.

Specifically, according to one aspect of the present application, receiving first information, the first information being used to indicate that the first data block belongs to the first data block set.

Specifically, according to one aspect of the present application, transmitting second information, the second information being used to determine that the first data block belongs to the first data block set.

Specifically, according to one aspect of the present application, a first parameter set is used to determine QoS information of the first data block.

Specifically, according to one aspect of the present application, transmitting third information, the third information being used to indicate at least one parameter in the first parameter set.

Specifically, according to one aspect of the present application, the first parameter set comprises a QoS parameter of the first QoS flow.

Specifically, according to one aspect of the present application, the first parameter set comprises a first parameter, the first parameter being neither a QoS parameter of the first QoS flow nor a QoS characteristic of the first QoS flow.

Specifically, according to one aspect of the present application, the first parameter set comprises a number of data blocks comprised in the first data block set.

Specifically, according to one aspect of the present application, the first parameter set comprises an arriving time of the first data block and an arriving time of the second data block.

Specifically, according to one aspect of the present application, the first parameter set comprises first time information and second time information, the first time information and the second time information being respectively for the first data block and the second data block, and the first time information and the second time information being different.

Specifically, according to one aspect of the present application, the first parameter set comprises QoS information of the second data block.

Specifically, according to one aspect of the present application, transmitting a first candidate identifier set, where each candidate identifier in the first candidate identifier set is linked with a delay requirement;

herein, the first parameter set comprises a candidate identifier in the first candidate identifier set.

Specifically, according to one aspect of the present application, the QoS information of the first data block comprises a priority, and the QoS information of the second data block comprises a priority; the priority of the first data block and the priority of the second data block are different; the priority of one of the first data block and the second data block is equal to a priority indicated by a QoS parameter of the first QoS flow or by a QoS characteristic of the first QoS flow.

Specifically, according to one aspect of the present application, receiving a first measurement report, the first measurement report comprising a delay report of the first data block set, where QoS information of respective data blocks in the first data block set are used together for generating the delay report of the first data block set.

Specifically, according to one aspect of the present application, transmitting fourth information, the fourth information indicating that there exists dependency between the first data block and the second data block.

Specifically, according to one aspect of the present application, the second node is a base station.

Specifically, according to one aspect of the present application, the second node is a UE.

Specifically, according to one aspect of the present application, the second node is a relay.

Specifically, according to one aspect of the present application, the second node is a vehicle-mounted terminal.

Specifically, according to one aspect of the present application, the second node is an aircraft.

Specifically, according to one aspect of the present application, the second node is a satellite.

The present application provides a first node for wireless communications, comprising:

a first transmitter, transmitting a first data block; Quality of Service (QoS) information of the first data block being used for the action of transmitting a first data block;

herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

The present application provides a second node for wireless communications, comprising:

a second receiver, receiving a first data block; Quality of Service (QoS) information of the first data block being used for transmitting the first data block;

herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, compared with the prior art, the present application is advantageous in the following aspects:

supporting more diverse service types, such as XR service;

enhancing the flexibility of the network;

better meeting requirements for XR services;

supporting packet-based QoS processing;

supporting QoS information based on data block sets;

supporting integrated processing based on data block sets;

providing better compatibility with the existing network architecture.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
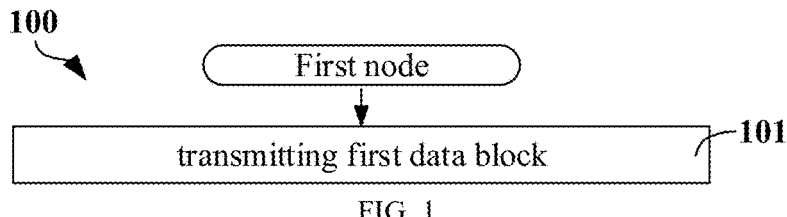
FIG. 1 illustrates a flowchart of transmitting a first data block according to one embodiment of the present application.

Embodiment 1 illustrates a flowchart of transmitting a first data block according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application transmits a first data block in step 101;

herein, QoS information of the first data block is used for the action of transmitting a first data block;

herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the first node is a User Equipment (UE).

In one embodiment, the first node is a node in RAN.

In one embodiment, the first node is in an RRC connected state.

In one embodiment, the first data block is a PDU.

In one embodiment, the first data block is a PDCP PDU.

In one embodiment, the first data block is a PDCP SDU.

In one embodiment, the first data block is a SDAP PDU.

In one embodiment, the first data block is a SDAP SDU.

In one embodiment, the first data block is an IP packet.

In one embodiment, the first data block is a payload of an IP packet.

In one embodiment, the first data block is a payload of a PDU.

In one embodiment, the first data block is an SDU.

In one embodiment, the first data block is an application layer PDU.

In one embodiment, the first data block is a Non-Access-Stratum PDU.

In one embodiment, the first data block is generated by a PDCP layer or a protocol layer above the PDCP layer.

In one subembodiment, the first data block is a PDU of a PDCP layer.

In one subembodiment, the first data block is a PDU of a protocol layer above a PDCP layer.

In one embodiment, the first node transmits the first data block set.

In one embodiment, the first node transmits the second data block.

In one embodiment, the first data block set comprises a limited number of data blocks.

In one embodiment, any data block in the first data block set belongs to the same service.

In one embodiment, any data block in the first data block set belongs to the same PDU session.

In one embodiment, the first node generates all bits in all data blocks comprised in the first data block set.

In one embodiment, the first node forwards bits generated by other nodes via the first data block.

In one embodiment, the first node forwards bits generated by other nodes via the second data block.

In one embodiment, at least partial bits in any data block in the first data block set are generated by an XR server.

In one embodiment, at least partial bits in any data block in the first data block set are generated by an Edge server.

In one embodiment, at least partial bits in any data block in the first data block set are generated by a core network device.

In one embodiment, at least partial bits in any data block in the first data block set are generated by an access network device.

In one embodiment, the second data block is a PDU.

In one embodiment, the second data block is an SDU.

In one embodiment, any data block in the first data block set is generated by a PDCP layer.

In one embodiment, any data block in the first data block set is generated by an SDAP layer.

In one embodiment, any data block in the first data block set is generated by an IP layer.

In one embodiment, any data block in the first data block set is generated by a transmission layer.

In one embodiment, any data block in the first data block set is generated by an application layer.

In one embodiment, any data block in the first data block set is generated by a transmission network layer.

In one embodiment, any data block in the first data block set is generated by a network layer.

In one embodiment, the sentence that any data block comprised in the first data block set is linked with a first QoS flow means that any data block comprised in the first data block set carries an identity of the first QoS flow.

In one embodiment, the sentence that any data block comprised in the first data block set is linked with a first QoS flow means that a PDU bearing any data block comprised in the first data block set carries an identity of the first QoS flow.

In one embodiment, the sentence that any data block comprised in the first data block set is linked with a first QoS flow means that an SDU bearing any data block comprised in the first data block set carries an identity of the first QoS flow.

In one embodiment, the sentence that any data block comprised in the first data block set is linked with a first QoS flow means that there exists a mapping relationship between transmission resources occupied by any data block comprised in the first data block set and the first QoS flow.

In one embodiment, the sentence that any data block comprised in the first data block set is linked with a first QoS flow means that there exists a mapping relationship between a channel occupied by any data block comprised in the first data block set and the first QoS flow.

In one embodiment, the sentence that any data block comprised in the first data block set is linked with a first QoS flow means that any data block comprised in the first data block set belongs to the first QoS flow.

In one embodiment, the sentence that any data block comprised in the first data block set is linked with a first QoS flow means that there exists a mapping relationship between transmission resources occupied by a PDU bearing any data block comprised in the first data block set and the first QoS flow.

In one embodiment, the sentence that any data block comprised in the first data block set is linked with a first QoS flow means that there exists a mapping relationship between a channel occupied by a PDU bearing any data block comprised in the first data block set and the first QoS flow.

In one embodiment, the sentence that any data block comprised in the first data block set is linked with a first QoS flow means that a PDU bearing any data block comprised in the first data block set belongs to the first QoS flow.

In one embodiment, the sentence that any data block comprised in the first data block set is linked with a first QoS flow means that there exists a mapping relationship between transmission resources occupied by an SDU comprised in any data block comprised in the first data block set and the first QoS flow.

In one embodiment, the sentence that any data block comprised in the first data block set is linked with a first QoS flow means that there exists a mapping relationship between a channel occupied by an SDU comprised in any data block comprised in the first data block set and the first QoS flow.

In one embodiment, the sentence that any data block comprised in the first data block set is linked with a first QoS flow means that an SDU comprised in any data block comprised in the first data block set belongs to the first QoS flow.

In one embodiment, the sentence that any data block comprised in the first data block set is linked with a first QoS flow means that a bearer or interface used by the first data block is for the first QoS flow.

In one embodiment, the sentence that any data block comprised in the first data block set is linked with a first QoS flow means that a bearer or interface used by an SDU of the first data block is for the first QoS flow.

In one embodiment, the sentence that any data block comprised in the first data block set is linked with a first QoS flow means that a bearer or interface used by a PDU bearing the first data block is for the first QoS flow.

In one embodiment, the sentence that any data block comprised in the first data block set is linked with a first QoS flow means that any data block comprised in the first data block set is data of the first QoS flow.

In one embodiment, the sentence that any data block comprised in the first data block set is linked with a first QoS flow means that any data block comprised in the first data block set contains a data block of the first QoS flow.

In one embodiment, the sentence that any data block comprised in the first data block set is linked with a first QoS flow means that any data block comprised in the first data block set contains a PDU of the first QoS flow.

In one embodiment, the QoS information of the first data block is different from QoS information of the second data block means that: the value of the QoS information of the first data block is different from the value of the counterpart of the QoS information of the second data block.

In one embodiment, an item comprised in the QoS information of the first data block and an item comprised in the QoS information of the second data block are identical, but with different values.

In one embodiment, the sentence that the QoS information of the first data block comprises a delay requirement means that the QoS information of the first data block comprises a requirement for transmission delay that is allowable or maximum.

In one embodiment, the sentence that the QoS information of the first data block comprises a delay requirement means that the QoS information of the first data block comprises a requirement for transmission delay jitter that is allowable or maximum.

In one embodiment, the sentence that the QoS information of the first data block comprises a delay requirement means that the QoS information of the first data block comprises a packet delay budget (PDB) that is allowable or maximum.

In one embodiment, a first parameter set is used to determine QoS information of the first data block.

In one embodiment, the first parameter set comprises at least one parameter.

In one embodiment, the first parameter set is indicated by another node.

In one embodiment, the first parameter set is pre-defined by protocol.

In one embodiment, the first parameter set is related to the first data block set.

In one embodiment, the first parameter set is related to the second data block.

In one embodiment, at least one parameter in the first parameter set is indicated by another node.

In one embodiment, the first parameter set comprises a QoS parameter of the first QoS flow.

In one embodiment, the first parameter set comprises a QoS characteristic of the first QoS flow.

In one embodiment, the first parameter set comprises 5QI of the first QoS flow.

In one embodiment, at least one parameter in the first parameter set is transmitted together with the first data block.

In one embodiment, the first parameter set comprises a first parameter, the first parameter being neither a QoS parameter of the first QoS flow nor a QoS characteristic of the first QoS flow.

In one subembodiment, the first parameter is a parameter other than a QoS parameter or QoS characteristic of the first QoS flow.

In one subembodiment, the first parameter is unrelated to a QoS parameter or QoS characteristic of the first QoS flow.

In one subembodiment, the first parameter is unrelated to a QoS target.

In one subembodiment, the first parameter is a number of data blocks comprised in the first data block set.

In one subembodiment, the first parameter is QoS information of the first data block set.

In one subembodiment, the first parameter is one of a QoS parameter or QoS characteristic of the first data block set.

In one subembodiment, the first parameter is QoS information of the second data block.

In one subembodiment, the first parameter is one of QoS parameters of the second QoS flow.

In one subembodiment, the first parameter is one of QoS characteristics of the second QoS flow.

In one subembodiment, the first parameter is an arriving time of the first data block.

In one subembodiment, the first parameter is used to indicate a latest time that the first data block or an SDU comprised in the first data block is allowed to be transmitted.

In one subembodiment, the first parameter is a time offset.

In one subembodiment, the first parameter is a sequence number or an offset of a sequence number.

In one subembodiment, the first parameter is an identity of a channel, or an interface, or a port, or a session or a flow.

In one subembodiment, the first parameter is a sequence number.

In one subembodiment, the first parameter indicates a radio bearer.

In one subembodiment, the first parameter is a parameter of tunnel protocol.

In one subembodiment, the first parameter is a COUNT value.

In one subembodiment, the first parameter is a priority of the first data block.

In one subembodiment, the first parameter is a priority of the second data block.

In one subembodiment, the first parameter is a size of the first data block.

In one subembodiment, the first parameter is a type of the first data block.

In one subembodiment, the first parameter is a type of a time-frequency frame that the first data block bears.

In one subembodiment, the first parameter is a PDB of the first data block set.

In one subembodiment, the first parameter is a delay requirement of the first data block set.

In one embodiment, the first parameter set comprises a number of data blocks comprised in the first data block set.

In one subembodiment, the first parameter set comprises a number of data blocks comprised in the first data block set.

In one subembodiment, the first data block set comprises a positive integer number of data block(s).

In one embodiment, the first parameter set comprises an arriving time of the first data block and an arriving time of the second data block.

In one embodiment, the first parameter set comprises a difference between an arriving time of the first data block and an arriving time of the second data block.

In one subembodiment, there is a dependency relationship between the first data block set and the second data block.

In one subembodiment, decoding or rendering of the first data block is dependent upon the second data block.

In one embodiment, the first parameter set comprises an average arriving time of the first data block set.

In one embodiment, an arrival of the first data block is later than the second data block, so the delay requirement comprised in the QoS information of the first data block is higher than the delay requirement comprised in the QoS information of the second data block.

In one subembodiment, a maximum processing delay or a maximum buffer delay that is allowable for the first data block is smaller than a maximum processing delay or a maximum buffer delay that is allowable for the second data block.

In one embodiment, an arrival of the first data block is earlier than the second data block, so the delay requirement comprised in the QoS information of the first data block is lower than the delay requirement comprised in the QoS information of the second data block.

In one subembodiment, a maximum processing delay or a maximum buffer delay that is allowable for the first data block is larger than a maximum processing delay or a maximum buffer delay that is allowable for the second data block.

In one embodiment, the second data block is a data block in the first data block set that arrives earliest.

In one embodiment, each data block other than the second data block in the first data block set is dependent on the second data block.

In one embodiment, the second data block comprises a frame I.

In one embodiment, the first data block comprises a frame P or the first data block comprises a frame B.

In one embodiment, QoS information of the second data block is a reference for QoS information of the first data block.

In one embodiment, the first parameter set comprises first time information and second time information, the first time information and the second time information being respectively for the first data block and the second data block, and the first time information and the second time information being different.

In one subembodiment, the first time information and the second time information are respectively absolute times.

In one subembodiment, the first time information and the second time information are respectively UTC times.

In one subembodiment, the first time information and the second time information are respectively time offsets for a same instance of time.

In one subembodiment, a delay requirement of the QoS information of the first data block is time indicated by the first time information.

In one subembodiment, a delay requirement of the QoS information of the second data block is time indicated by the second time information.

In one subembodiment, the first time information and the second time information are measured in the unit of millisecond (ms).

In one subembodiment, the first time information and the second time information are measured in the unit of microsecond (μs).

In one subembodiment, the first time information and the second time information are measured in the unit of 0.5 millisecond (ms).

In one subembodiment, the first time information and the second time information are measured in the unit of X millisecond (ms), where X is a non-zero real number.

In one subembodiment, the first data block and the second data block arrive at different times.

In one subembodiment, the first data block and the second data block are transmitted at different times.

In one subembodiment, the first time information and the PDB of the first QoS flow are used together to determine the QoS information of the first data block.

In one subembodiment, the first time information is an offset relative to the PDB of the first QoS flow.

In one subembodiment, the second time information and the PDB of the first QoS flow are used together to determine the QoS information of the second data block.

In one subembodiment, the first time information is relative to a data block comprised in the first data block set other than the first data block.

In one subembodiment, the first time information is relative to a key data block comprised in the first data block set other than the first data block.

In one subembodiment, the first time information is relative to the second data block.

In one embodiment, the first parameter set comprises partial items of QoS information of the second data block.

In one embodiment, the first parameter set comprises all items of QoS information of the second data block.

In one embodiment, QoS information of the first data block is based on QoS information of the second data block.

In one subembodiment, the QoS information of the first data block is obtained adding time indicated by the first time information based on the QoS information of the second data block.

In one subembodiment, the QoS information of the first data block is obtained curtailing time indicated by the first time information based on the QoS information of the second data block.

In one embodiment, the QoS information of the second data block comprises the PDB of the first QoS flow.

In one embodiment, a requirement for relay comprised in the QoS information of the second data block is the PDB of the first QoS flow.

In one embodiment, the first parameter set comprises a sequence number of the first data block.

In one embodiment, the first parameter set comprises a sequence number of the second data block.

In one embodiment, the larger the sequence number of the first data block, the more stringent the delay requirement comprised in the QoS information of the first data block.

In one embodiment, the larger the sequence number of the first data block, the looser the delay requirement comprised in the QoS information of the first data block.

In one embodiment, the larger the sequence number of the first data block, the more stringent the delay requirement comprised in the QoS information of the second data block.

In one embodiment, the larger the sequence number of the first data block, the looser the delay requirement comprised in the QoS information of the second data block.

In one embodiment, the first parameter set comprises a difference between a sequence number of the first data block and a sequence number of the second data block.

In one embodiment, the larger the difference between a sequence number of the first data block and a sequence number of the second data block, the more stringent the delay requirement comprised in the QoS information of the first data block.

In one embodiment, the larger the difference between a sequence number of the first data block and a sequence number of the second data block, the looser the delay requirement comprised in the QoS information of the first data block.

In one embodiment, the QoS information of the first data block comprises a priority, and the QoS information of the second data block comprises a priority.

In one subembodiment, the priority of the first data block and the priority of the second data block are different.

In one subembodiment, the priority of the first data block and the priority of the second data block are the same, while the delay requirement of the first data block and the delay requirement of the second data block are different.

In one subembodiment, the priority of the first data block and the priority of the second data block are different, while the delay requirement of the first data block and the delay requirement of the second data block are the same.

In one subembodiment, the priority of the first data block is equal to a priority indicated by a QoS parameter of the first QoS flow.

In one subembodiment, the priority of the first data block is equal to a priority indicated by a QoS characteristic of the first QoS flow.

In one subembodiment, the priority of the second data block is equal to a priority indicated by a QoS parameter of the first QoS flow.

In one subembodiment, the priority of the second data block is equal to a priority indicated by a QoS characteristic of the first QoS flow.

In one subembodiment, the higher the delay requirement comprised in the QoS information of the first data block, the higher the priority comprised in the QoS information of the first data block; the lower the delay requirement comprised in the QoS information of the first data block, the lower the priority comprised in the QoS information of the first data block.

In one embodiment, the first parameter set comprises a QoS parameter for the first data block set.

In one embodiment, the first parameter set comprises a QoS characteristic for the first data block set.

In one embodiment, the first parameter set comprises QoS information for the first data block set.

In one embodiment, the first parameter set comprises a delay requirement for the first data block set.

In one embodiment, the action of transmitting a first data block comprises: mapping the first data block to radio bearers (RBs) in a first radio bearer set according to the QoS information of the first data block; the first radio bearer set comprises at least two RBs.

In one subembodiment, any radio bearer comprised in the first radio bearer set is a DRB.

In one subembodiment, any radio bearer comprised in the first radio bearer set is an MRB.

In one subembodiment, any radio bearer comprised in the first radio bearer set is an SRB.

In one subembodiment, any radio bearer comprised in the first radio bearer set is a radio bearer other than an SRB.

In one subembodiment, the first node determines to map the first data block onto a radio bearer in the first radio bearer set according to the traffic volume of radio bearers in the first radio bearer set and QoS information of data block(s) not yet transmitted in the first data block set.

In one subembodiment, each data block with higher or more stringent delay requirement indicated by QoS information of the data block in the first data block set is mapped onto a radio bearer corresponding to a smaller traffic volume in the first radio bearer set.

In one subembodiment, each data block with higher or more stringent delay requirement indicated by QoS information of the data block in the first data block set is mapped onto a radio bearer corresponding to a better channel condition in the first radio bearer set.

In one subembodiment, each data block with higher or more stringent delay requirement indicated by QoS information of the data block in the first data block set is mapped onto a radio bearer corresponding to less buffered data in the first radio bearer set.

In one subembodiment, the QoS information of the first data block comprises a priority, where data blocks with different priorities in the first data block set are mapped onto respectively corresponding radio bearers in the first radio bearer set.

In one subembodiment, data blocks having different delay requirements in the first data block set are respectively mapped onto radio bearers pre-configured in the first radio bearer set.

In one embodiment, the first QoS flow is mapped onto a first radio bearer (RB), the first RB being linked with a first RLC entity set; the action of transmitting a first data block comprises: mapping the first data block to an RLC entity in a first RLC entity set according to the QoS information of the first data block; the first RLC entity set comprises at least two RLC entities.

In one embodiment, the first QoS flow is mapped onto a first radio bearer (RB), the first RB being linked with a first RLC bearer set; the action of transmitting a first data block comprises: mapping the first data block to an RLC bearer in a first RLC bearer set according to the QoS information of the first data block; the first RLC bearer set comprises at least two RLC bearers.

In one embodiment, the first QoS flow is mapped onto a first radio bearer (RB), the first RB being linked with a first RLC configuration index set; the action of transmitting a first data block comprises: mapping the first data block to an RLC entity linked with an RLC configuration index in a first RLC configuration index set according to the QoS information of the first data block; the first RLC configuration index set comprises at least two RLC configuration indexes.

In one embodiment, the first QoS flow is mapped onto a first radio bearer (RB), the first RB being linked with a first RLC channel set; the action of transmitting a first data block comprises: mapping the first data block to an RLC channel in a first RLC channel set according to the QoS information of the first data block; the first RLC channel set comprises at least two RLC channels.

Embodiment 2

Figure 2:
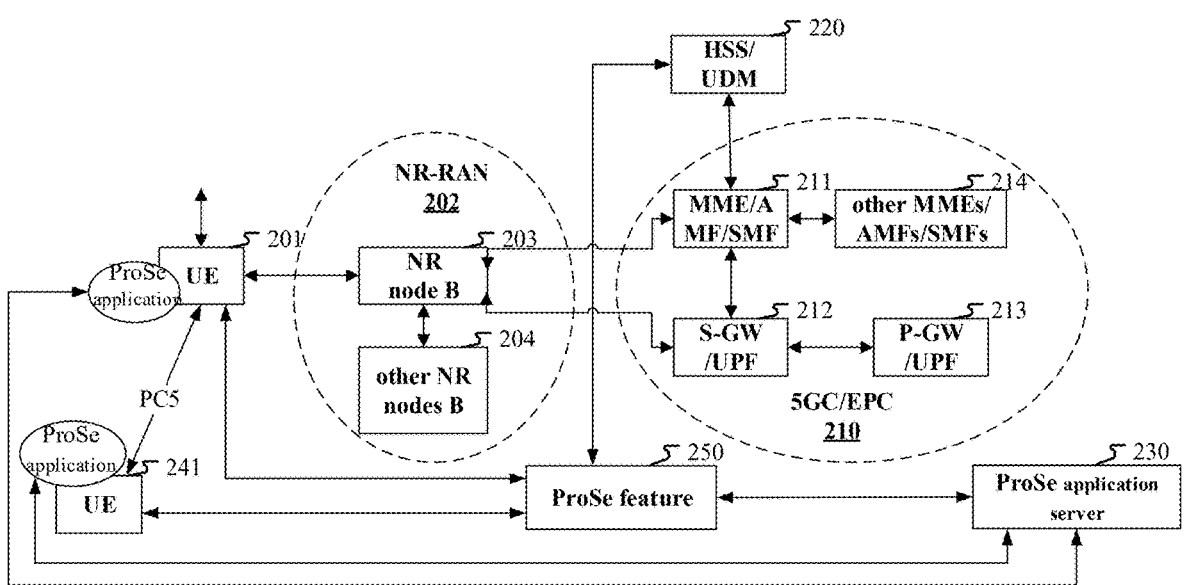
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management(HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application is the UE 201.

In one embodiment, a base station of the first node in the present application is the gNB203.

In one embodiment, the second node in the present application is the UE 201.

In one embodiment, a base station of the second node in the present application is the gNB203.

In one embodiment, a radio link from the UE 201 to the NR Node B is an uplink.

In one embodiment, a radio link from the NR Node B to the UE 201 is a downlink.

In one embodiment, the UE 201 supports relay transmission.

In one embodiment, the UE 201 includes cellphone.

In one embodiment, the UE 201 is a means of transportation including automobile.

In one embodiment, the UE 201 supports sidelink transmission.

In one embodiment, the UE 201 supports MBS transmission.

In one embodiment, the UE 201 supports MBMS transmission.

In one embodiment, the gNB 203 is a MacroCellular base station.

In one embodiment, the gNB203 is a Micro Cell base station.

In one embodiment, the gNB 203 is a PicoCell base station.

In one embodiment, the gNB203 is a flight platform.

In one embodiment, the gNB203 is satellite equipment.

Embodiment 3

Figure 3:
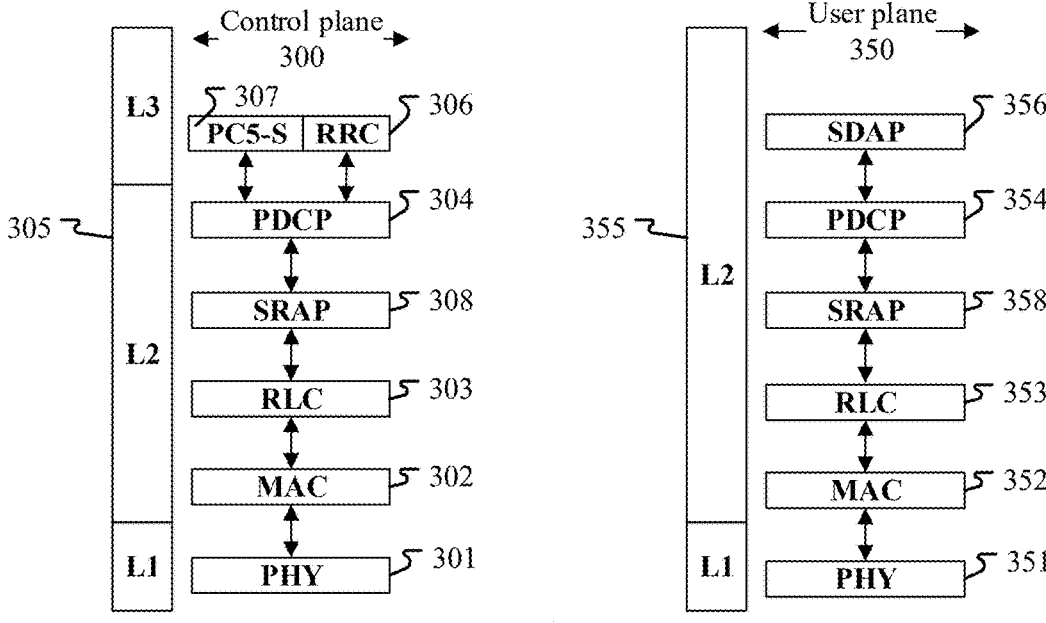
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. An SRB can be seen as the service or interface provided by a PDCP layer for a higher layer, such as RRC layer. The SRBs in an NR system include SRB1, SRB2, and SRB3, and optionally, SRB4 when concerning sidelink communications, which are respectively used for transmitting all types of control signalings. The SRB is a bearer between a UE and an access network used for transmitting control signalings between them, including an RRC signaling. The SRB1 has special meaning to the UE, since for each UE that has established RRC connection, there is an SRB1 that is used for transmitting RRC signaling, and most signalings are transmitted via the SRB1. If the SRB1 is interrupted or cannot work, the UE will have to perform RRC re-establishment. The SRB2 is generally used for transmitting NAS signaling or any signaling concerning security. The UE can be configured without the SRB3. Unless for urgent traffics, the UE must establish an RRC connection with the network to proceed with communications. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involving relay services, its control plane can also comprise an Adaptation sublayer Sidelink Relay Adaptation Protocol (SRAP) 308, and its user plane can also comprise an Adaptation sublayer SRAP358. The introduction of the Adaptation layer is beneficial to lower layers, for instance, a MAC layer, or an RLC layer, to multiplex and/or distinguish data from multiple source UEs. For nodes not joined in relay communications, none of the PC5-S307, SRAP308 and SRAP358 will be needed in the process of communications.

In one embodiment, the radio protocol architecture in FIG. 3 is applicable to the first node in the present application.

In one embodiment, the radio protocol architecture in FIG. 3 is applicable to the second node in the present application.

In one embodiment, the first data block set in the present application is generated by protocol layers above the PDCP354 or SDAP356 or SDAP356.

In one embodiment, the second data block set in the present application is generated by protocol layers above the PDCP354 or SDAP356 or SDAP356.

In one embodiment, the first information in the present application is generated by the MAC302 or RRC306 or NAS.

In one embodiment, the second information in the present application is generated by the MAC302 or RRC306 or NAS.

In one embodiment, the third information in the present application is generated by the MAC302 or RRC306 or NAS.

In one embodiment, the fourth information in the present application is generated by the MAC302 or RRC306 or NAS.

In one embodiment, the first candidate identifier set in the present application is generated by the RRC306 or NAS.

In one embodiment, the first measurement report in the present application is generated by the RRC306 or NAS.

Embodiment 4

Figure 4:
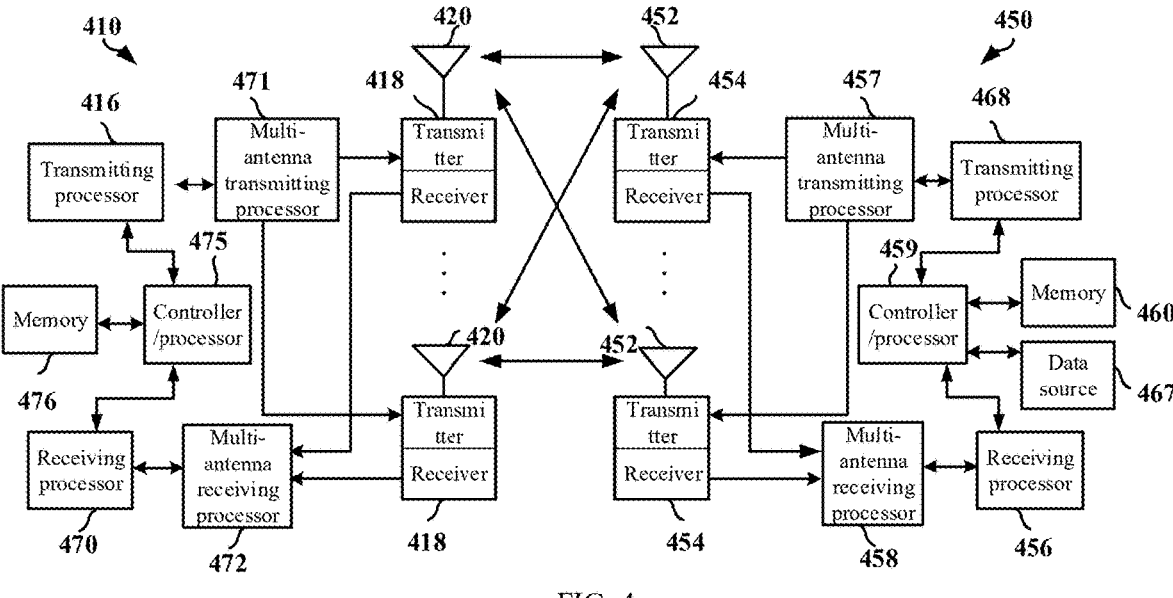
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, and optionally a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, and optionally a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer (Layer-2). In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: transmits a first data block; Quality of Service (QoS) information of the first data block being used for the action of transmitting a first data block; herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the first communication node 450 comprises a memory that stores a computer readable instruction program, the computer readable instruction program generates actions when executed by at least one processor, which include: transmitting a first data block; Quality of Service (QoS) information of the first data block being used for the action of transmitting a first data block; herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: receives a first data block; Quality of Service (QoS) information of the first data block being used for transmitting the first data block; herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the second communication node 410 comprises a memory that stores a computer readable instruction program, the computer readable instruction program generates actions when executed by at least one processor, which include: receiving a first data block; Quality of Service (QoS) information of the first data block being used for transmitting the first data block; herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a vehicle-mounted terminal.

In one embodiment, the second communication device 410 is a relay.

In one embodiment, the second communication device 410 is a satellite.

In one embodiment, the second communication device 410 is an aircraft.

In one embodiment, the second communication device 410 is a base station.

In one embodiment, the first communication device 450 is a base station.

In one embodiment, the second communication device 410 is a UE.

In one embodiment, the receiver 454 (comprising the antenna 452), the receiving processor 456 and the controller/processor 459 are used for receiving the second information in the present application.

In one embodiment, the receiver 454 (comprising the antenna 452), the receiving processor 456 and the controller/processor 459 are used for receiving the third information in the present application.

In one embodiment, the receiver 454 (comprising the antenna 452), the receiving processor 456 and the controller/processor 459 are used for receiving the fourth information in the present application.

In one embodiment, the receiver 454 (comprising the antenna 452), the receiving processor 456 and the controller/processor 459 are used for receiving the first identifier set in the present application.

In one embodiment, the transmitter 454 (comprising the antenna 452), the transmitting processor 468 and the controller/processor 459 are used for transmitting the first data block in the present application.

In one embodiment, the transmitter 454 (comprising the antenna 452), the transmitting processor 468 and the controller/processor 459 are used for transmitting the first data block set in the present application.

In one embodiment, the transmitter 454 (comprising the antenna 452), the transmitting processor 468 and the controller/processor 459 are used for transmitting the second data block set in the present application.

In one embodiment, the transmitter 454 (comprising the antenna 452), the transmitting processor 468 and the controller/processor 459 are used for transmitting the first information in the present application.

In one embodiment, the transmitter 454 (comprising the antenna 452), the transmitting processor 468 and the controller/processor 459 are used for transmitting the first measurement report in the present application.

In one embodiment, the transmitter 418 (comprising the antenna 420), the transmitting processor 416 and the controller/processor 475 are used for transmitting the second information in the present application.

In one embodiment, the transmitter 418 (comprising the antenna 420), the transmitting processor 416 and the controller/processor 475 are used for transmitting the third information in the present application.

In one embodiment, the transmitter 418 (comprising the antenna 420), the transmitting processor 416 and the controller/processor 475 are used for transmitting the fourth information in the present application.

In one embodiment, the transmitter 418 (comprising the antenna 420), the transmitting processor 416 and the controller/processor 475 are used for transmitting the first identifier set in the present application.

In one embodiment, the receiver 418 (comprising the antenna 420), the receiving processor 470 and the controller/processor 475 are used for receiving the first data block set in the present application.

In one embodiment, the receiver 418 (comprising the antenna 420), the receiving processor 470 and the controller/processor 475 are used for receiving the second data block set in the present application.

In one embodiment, the receiver 418 (comprising the antenna 420), the receiving processor 470 and the controller/processor 475 are used for receiving the first information in the present application.

In one embodiment, the receiver 418 (comprising the antenna 420), the receiving processor 470 and the controller/processor 475 are used for receiving the first data block in the present application.

Embodiment 5

Figure 5:
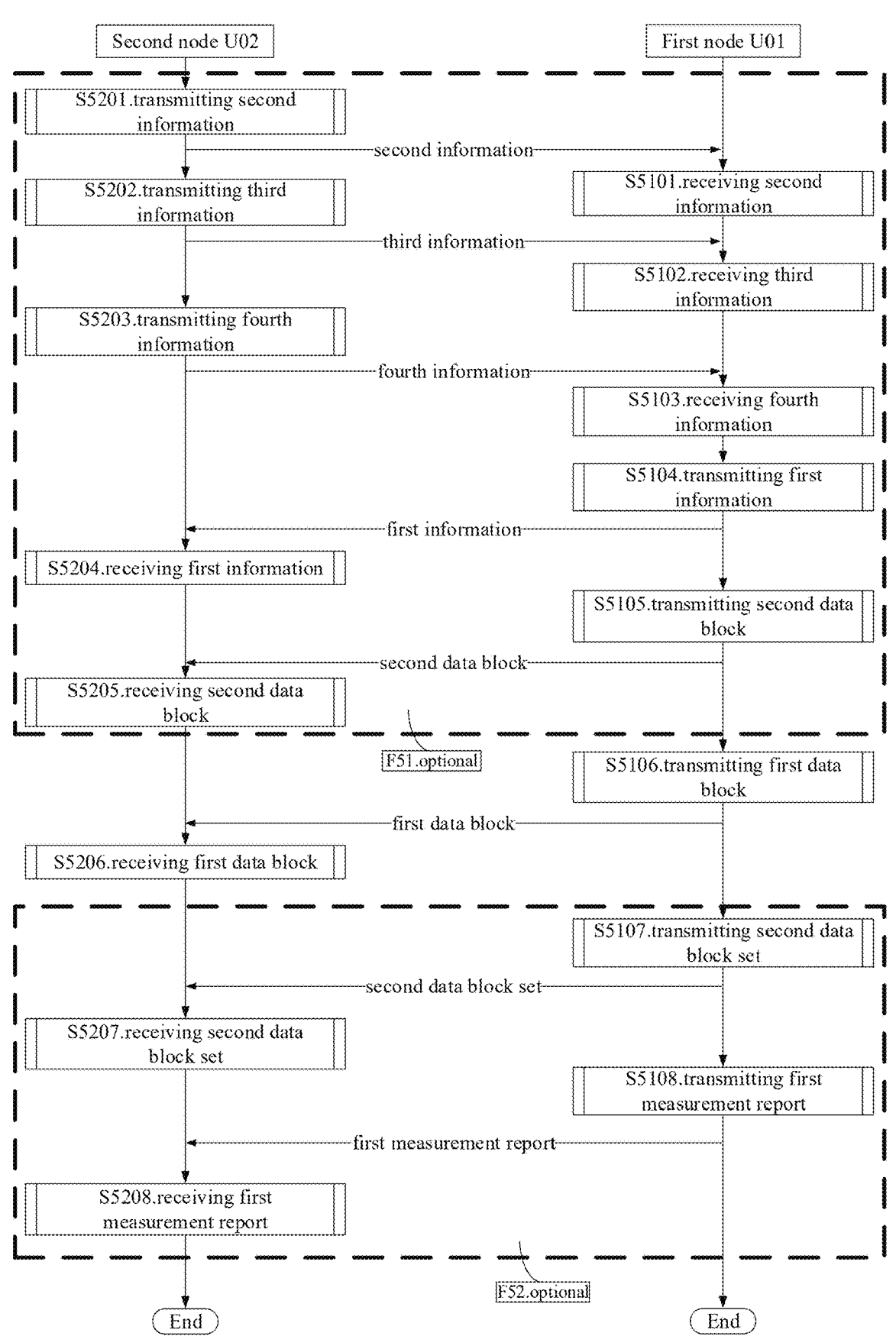
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to the first node in the present application, and U02 corresponds to the second node in the present application. It should be particularly noted that the sequence illustrated herein does not set any limit on the orders in which signals are transmitted and implementations in this present application. Herein, steps in F51 and F52 are optional.

The first node U01 receives second information in step S5101; receives third information in step S5102; and receives fourth information in step S5103; transmits first information in step S5104; transmits a second datablock in step S5105; transmits a first datablock in step S5106; transmits a second datablock set in step S5107; and transmits a first measurement report in step S5108.

The second node U02 transmits second information in step S5201; transmits third information in step S5202; transmits fourth information in step S5203; and receives first information in step S5204; receives a second data block in step S5205; receives a first data block in step S5206; receives a second data block set in step S5207; and receives a first measurement report in step S5208.

In Embodiment 5, Quality of Service (QoS) information of the first data block being used for the action of transmitting a first data block; herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the first node U01 is a UE, and the second node U02 is a serving cell or a cell group of the first node U01.

In one subembodiment, the first data block is transmitted using uplink resources or an uplink.

In one embodiment, the first node U01 is a UE, and the second node U02 is a base station serving the first node U01.

In one subembodiment, the first data block is transmitted using uplink resources or an uplink.

In one embodiment, the first node U01 transmits the first data block via an uplink.

In one embodiment, the second information comprises an RRC message.

In one embodiment, the second information comprises a NAS message.

In one embodiment, the second information is generated by the second node U02.

In one embodiment, the second information is generated by a core network or an application server or an edge computing server.

In one embodiment, the second information indicates configuration information of the first data block set, the configuration information of the first data block set being used to determine that the first data block belongs to the first data block set.

In one embodiment, the second information indicates data blocks comprised in the first data block set.

In one embodiment, the second information indicates a generation time range for data blocks comprised in the first data block set, where a generation time of the first data block belongs to the generation time range for the data blocks comprised in the first data block set.

In one embodiment, the second information indicates an arriving time range for data blocks comprised in the first data block set, where an arriving time of the first data block belongs to the arriving time range for the data blocks comprised in the first data block set.

In one embodiment, the second information indicates that data blocks comprised in the first data block set are all data blocks dependent on the second data block, of which the first data block depends on the second data block, so according to the second information, the first data block belongs to the second data block set.

In one embodiment, the second information indicates that the first data block set at least comprises the first data block.

In one embodiment, the second information indicates resources for transmitting the first data block set, with the first data block being scheduled to use the resources for transmitting the first data block set.

In one embodiment, the second information indicates a transmission of any field or identifier comprised in any data block in the first data block set; the first data block has the field or the identifier comprised in any data block in the first data block set.

In one embodiment, the third information comprises an RRC message.

In one embodiment, the third information comprises a NAS message.

In one embodiment, the third information is generated by the second node U02.

In one embodiment, the third information is generated by a core network or an application server or an edge computing server.

In one embodiment, the third information indicates each parameter comprised in a first parameter set.

In one embodiment, the third information indicates part of parameters comprised in a first parameter set.

In one embodiment, the third information indicates an index or an identity of a first parameter set.

In one embodiment, the fourth information indicating that there exists dependency between the first data block and the second data block.

In one embodiment, the fourth information comprises an RRC message.

In one embodiment, the fourth information comprises a NAS message.

In one embodiment, the fourth information is generated by the second node U02.

In one embodiment, the fourth information is generated by a core network or an application server or an edge computing server.

In one embodiment, the fourth information indicates a data block upon which the first data block is dependent.

In one embodiment, the fourth information indicates a data block upon which the second data block is dependent.

In one embodiment, the fourth information indicates that the second data block is dependent upon the first data block.

In one embodiment, the fourth information indicates that the first data block is dependent upon the second data block.

In one embodiment, the fourth information indicates that the second data block and the first data block are mutually dependent.

In one embodiment, on the condition that the second node U02 does not receive the first data block and the second data block is dependent on the first data block, the second data block is to be dropped.

In one embodiment, on the condition that the second node U02 does not receive the second data block and the first data block is dependent on second data block, the first data block is to be dropped.

In one embodiment, the fourth information indicates a data block on which any data block in the first data block set is dependent.

In one embodiment, the second information indicates the first data block set.

In one embodiment, the fourth information indicates the first data block set.

In one embodiment, the first information is used to indicate that the first data block belongs to the first data block set.

In one embodiment, the first information is a control signaling.

In one embodiment, the first information is an RRC signaling.

In one embodiment, the first information is Non-Access-Stratum (NAS) information.

In one embodiment, the first information and the first data block are transmitted together.

In one embodiment, the first information is a protocol header of the first data block.

In one embodiment, the first information indicates an identity of the first data block set that is carried by the first data block.

In one embodiment, the first information indicates an index of the first data block set that is carried by the first data block.

In one embodiment, the first data block comprises the first information.

In one embodiment, the first information indicates dedicated transmission resources occupied by the first data block set, where the first data block uses the dedicated transmission resources of the first data block set.

In one embodiment, the first information indicates characteristic parameters of the first data block set, the first data block carrying the characteristic parameters of the first data block set.

In one embodiment, the second data block and the first data block use a same logical channel.

In one embodiment, the second data block and the first data block use different logical channels.

In one embodiment, the second data block and the first data block use a same radio bearer.

In one embodiment, the second data block and the first data block use different radio bearers.

In one embodiment, the second information is used for configuring the first QoS flow.

In one embodiment, the third information is used for configuring the first QoS flow.

In one embodiment, the fourth information is used for configuring the first QoS flow.

In one embodiment, the second data block set comprises at least one data block, the second data block set being linked with a second QoS flow; QoS information of any two data blocks in the second datablock set are identical, and a QoS parameter of the second QoS flow is used to determine QoS information of any data block in the second data block set; any data block in the second data block set is generated by a same protocol layer.

In one embodiment, the second data block set comprises a limited number of data blocks.

In one embodiment, any data block in the second data block set belongs to the same service.

In one embodiment, any data block in the second data block set belongs to the same PDU session.

In one embodiment, the first data block set and the second data block set belong to the same service.

In one embodiment, the first data block set and the second data block set belong to a same PDU session.

In one embodiment, the first data block set and the second data block set belong to different services.

In one embodiment, the first data block set and the second data block set belong to different PDU sessions.

In one embodiment, the first data block set and the second data block set are generated by a same protocol layer.

In one embodiment, there exists a mapping relationship between 5QI in a QoS parameter of the second QoS flow and QoS information of any data block in the second data block set.

In one embodiment, a QoS parameter of the second QoS flow can be mapped to a QoS characteristic of the second QoS flow, where QoS information of any data block in the second data block set is from the QoS characteristic of the second QoS flow.

In one embodiment, QoS information of any data block in the second data block set is only related to a QoS parameter of the second QoS flow.

In one embodiment, QoS information of any data block in the second data block set is only related to a QoS characteristic of the second QoS flow.

In one embodiment, the second information is used to indicate whether QoS information of any two data blocks in the first data block set are identical.

In one embodiment, the third information is used to indicate whether QoS information of any two data blocks in the first data block set are identical.

In one embodiment, the fourth information is used to indicate whether QoS information of any two data blocks in the first data block set are identical.

In one embodiment, the first parameter set is used to determine whether QoS information of any two data blocks in the first data block set are identical.

In one embodiment, the first parameter set is used to determine whether QoS information of any two data blocks in the second data block set are identical.

In one embodiment, the second parameter set is used to determine whether QoS information of any two data blocks in the second data block set are identical.

In one embodiment, the second parameter set is indicated by the network.

In one embodiment, the second parameter set is configured by default.

In one embodiment, there exists no dependency between any two data blocks in the second data block set.

In one embodiment, any data block in the first data block set is a PDU of a data type.

In one embodiment, any data block in the second data block set is a PDU of a data type.

In one embodiment, the first node U01 receives a first candidate identifier set from the second node U02 or other network node including the core network, where each candidate identifier in the first candidate identifier set is associated with a delay requirement;

herein, the first parameter set comprises a candidate identifier in the first candidate identifier set.

In one embodiment, any candidate identifier in the first candidate identifier set is a QFI.

In one embodiment, the QoS parameter of the first QoS flow includes a first QFI.

In one embodiment, any candidate identifier in the first candidate identifier set is a sub-identifier of a first QFI.

In one embodiment, any candidate identifier in the first candidate identifier set is a spread-identifier of a first QFI.

In one embodiment, any candidate identifier in the first candidate identifier set is a quality of packet indicator (QPI).

In one embodiment, the first candidate identifier set comprises at least 2 identifiers.

In one embodiment, the sentence that each candidate identifier in the first candidate identifier set is linked with a delay requirement means that there exists a mapping relation between each candidate identifier in the first candidate identifier set and a delay requirement.

In one embodiment, the sentence that each candidate identifier in the first candidate identifier set is linked with a delay requirement means that each candidate identifier in the first candidate identifier set can uniquely determine a delay requirement.

In one embodiment, the first measurement report comprising a delay report of the first data block set, where QoS information of respective data blocks in the first data block set are used together for generating the delay report of the first data block set.

In one subembodiment, the delay report of the first data block set is generated by an average delay of the first data block set.

In one subembodiment, the delay report of the first data block set is generated by an average delay of any data block that satisfies the delay requirement comprised in QoS information comprised in the first data block set.

In one embodiment, the first node U01 is a base station, while the second node U02 is a UE.

In one subembodiment, the first data block is transmitted using downlink resources or a downlink.

In one embodiment, the second information comprises an RRC message.

In one embodiment, the second information comprises a MAC CE.

In one embodiment, the second information comprises at least partial fields in UEAssistanceInformation.

In one embodiment, the third information comprises an RRC message.

In one embodiment, the third information comprises a MAC CE.

In one embodiment, the third information comprises at least partial fields in UEAssistanceInformation.

In one embodiment, the fourth information comprises an RRC message.

In one embodiment, the fourth information comprises a MAC CE.

In one embodiment, the fourth information comprises at least partial fields in UEAssistanceInformation.

In one embodiment, the first data block is a PDCP PDU.

In one embodiment, the first data block is a PDCP SDU.

In one embodiment, the first data block is data of a QoS flow.

In one embodiment, the first information is a header of the first data block.

In one embodiment, the first information comprises DCI.

In one embodiment, the first information comprises a MAC CE.

In one embodiment, the first information comprises an RRC message.

In one embodiment, the first information comprises a message of a user plane.

In one embodiment, the first information comprises a message of a control plane.

In one embodiment, the first information comprises an identity of a logical channel.

In one embodiment, the first information comprises an identity or identifier of the first data block set.

In one embodiment, the first information indicates resources occupied by the first data block set.

In one embodiment, a transmission of the first data block set uses relay, while a transmission of the second data block set does not use relay; whether relay is used for transmission is used to determine whether QoS information of any data block set in a target data block set is identical, where the target data block set is the first data block set or the second data block set.

In one embodiment, when the first node U01 is a base station, and the second node U02 is a UE, neither of the step S5108 and the step S5208 is performed.

In one embodiment, the second data block is transmitted earlier than the first data block.

In one embodiment, the second data block is transmitted later than the first data block.

In one embodiment, the second data block and the first data block are transmitted simultaneously.

In one embodiment, at least two of the second information, the third information and the fourth information are borne by a same RRC message.

In one embodiment, at least one of the second information, the third information or the fourth information is an RRCReconfiguration message.

In one embodiment, at least one of the second information, the third information or the fourth information is a MAC CE or DCI.

Embodiment 6

Figure 6:
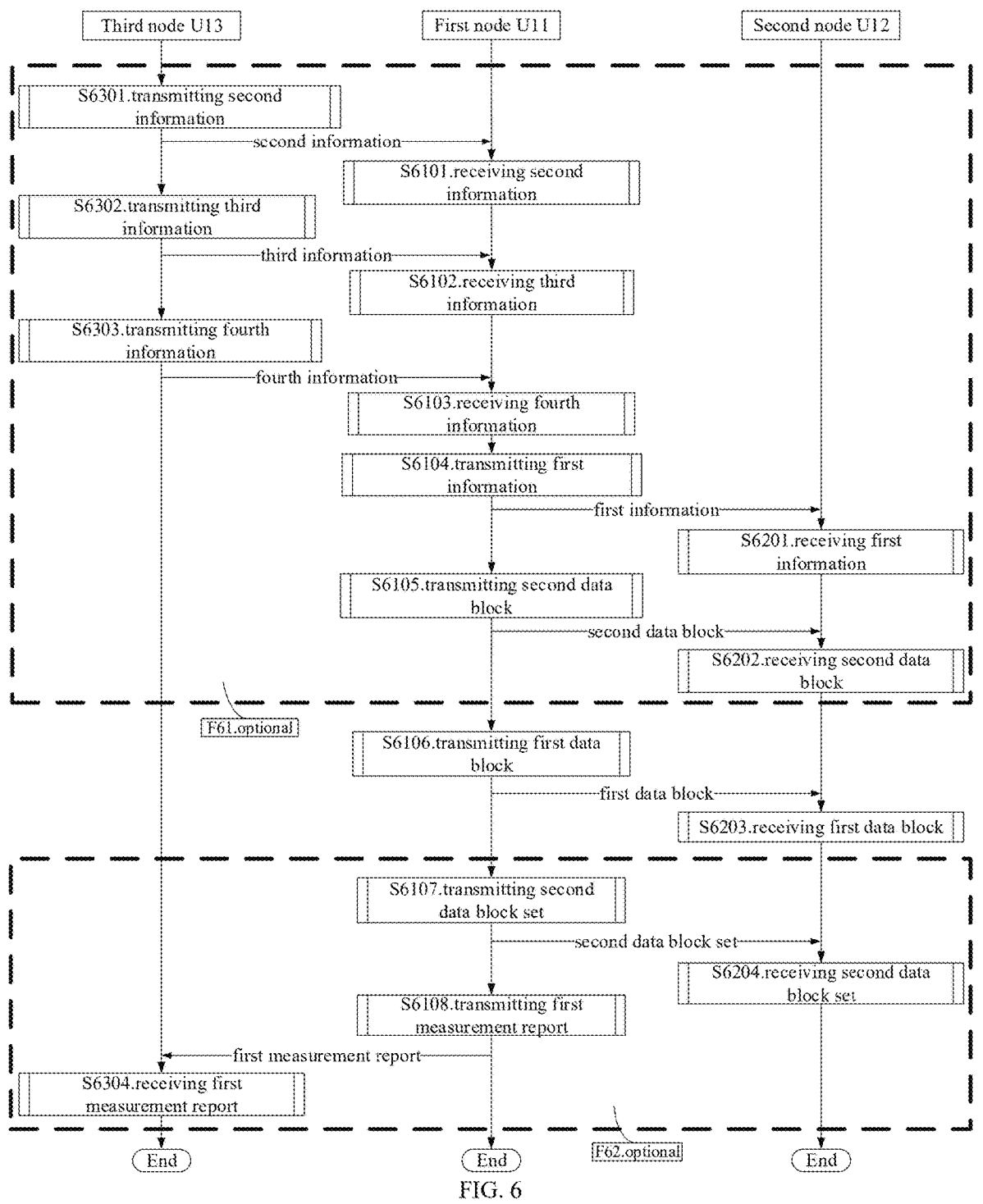
FIG. 6 illustrates a flowchart of radio signal transmission according to one embodiment of the present application.

Embodiment 6 illustrates a flowchart of signal transmission according to one embodiment of the present application, as shown in FIG. 6. In FIG. 6, U11 corresponds to the first node in the present application, and U12 corresponds to the second node in the present application. It should be particularly noted that the sequence illustrated herein does not set any limit on the orders in which signals are transmitted and implementations in this present application. Herein, steps in F61 and F62 are optional.

The first node U11 receives second information in step S6101; receives third information in step S6102; and receives fourth information in step S6103; transmits first information in step S6104; transmits a second data block in step S6105; transmits a first data block in step S6106; transmits a second data block set in step S6107; and transmits a first measurement report in step S6108.

The second node U12 receives first information in step S6201; receives a second data block in step S6202; receives a first data block in step S6203; and receives a second data block set in step S6204.

The third node U13 transmits second information in step S6301; transmits third information in step S6302; transmits fourth information in step S6203; and receives a first measurement report in step S6204.

In Embodiment 6, Quality of Service (QoS) information of the first data block being used for the action of transmitting a first data block; herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the first node U11 is a base station, the second node U12 is a UE, and the third node U13 is a core network device.

In one subembodiment, the core network device is a UPF.

In one subembodiment, the core network device is an AF.

In one subembodiment, the core network device is a server for XR services.

In one embodiment, the second information comprises an identity of the first QoS flow.

In one embodiment, the third information comprises an identity of the first QoS flow.

In one embodiment, the fourth information comprises an identity of the first QoS flow.

In one embodiment, at least two of the second information, the third information and the fourth information are borne by a same message.

In one embodiment, the second information comprises an identity of the first data block set.

In one embodiment, the third information comprises an identity of the first data block set.

In one embodiment, the fourth information comprises an identity of the first data block set.

In one embodiment, the first data block comprises data from the core network

In one embodiment, any data block in the first data block set comprises data from the core network.

In one embodiment, any data block in the second data block set comprises data from the core network.

In one embodiment, the second information and an SDU of the first data block are transmitted simultaneously.

In one embodiment, the second information is a protocol header of an SDU of the first data block.

In one embodiment, the second information comprises XR assistance information.

In one embodiment, the third information comprises XR assistance information.

In one embodiment, the fourth information comprises XR assistance information.

In one embodiment, the second information comprises a message in a procedure of establishing PDU Sessions.

In one embodiment, the second information comprises a PDU Session request message.

In one embodiment, the second information comprises a service request or a service approval message.

In one embodiment, the second information comprises a DL NAS transport message.

In one embodiment, the second information comprises a configuration update command.

In one embodiment, the third information comprises a message in a procedure of establishing PDU Sessions.

In one embodiment, the third information comprises a PDU Session request message.

In one embodiment, the third information comprises a service request or a service approval message.

In one embodiment, the third information comprises a DL NAS transport message.

In one embodiment, the third information comprises a configuration update command.

In one embodiment, the fourth information comprises a message in a procedure of establishing PDU Sessions.

In one embodiment, the fourth information comprises a PDU Session request message.

In one embodiment, the fourth information comprises a service request or a service approval message.

In one embodiment, the fourth information comprises a DL NAS transport message.

In one embodiment, the fourth information comprises a configuration update command.

In one embodiment, the name of at least one of the second information, the third information or the fourth information includes "XR".

In one embodiment, the first information comprises an RRC message.

In one embodiment, the first information comprises a MAC CE.

In one embodiment, the first information comprises DCI.

In one embodiment, the first information comprises a header of a PDCP PDU.

In one embodiment, the first information comprises a header or a sub-header of a MAC PDU.

In one embodiment, the first information comprises a field in a header or a sub-header of a MAC PDU.

In one embodiment, the first information comprises a logical channel identity.

In one embodiment, the first information comprises a spread logical channel identity.

In one embodiment, the first information comprises an identity of the first data block set.

In one embodiment, the first information comprises an index of the first data block set.

In one embodiment, the first information and the first data block are transmitted simultaneously.

In one embodiment, a transmission of the first information is later than a transmission of the first data block.

In one embodiment, a transmission of the first information is no earlier than a transmission of a last data block in the first data block set.

In one subembodiment, the last data block in the first data block set refers to a latest data block being transmitted.

In one subembodiment, the last data block in the first data block set refers to a latest data block being generated.

In one subembodiment, the last data block in the first data block set refers to a latest data block having arrived.

In one subembodiment, the last data block in the first data block set refers to a data block in which an SDU comprised is the latest one having arrived.

In one embodiment, the second data block is transmitted earlier than the first data block.

In one embodiment, the second data block is transmitted later than the first data block.

In one embodiment, the second data block and the first data block are transmitted simultaneously.

In one embodiment, the first data block is a first one of data blocks in the first data block set.

In one embodiment, the first data block is a last one of data blocks in the first data block set.

In one embodiment, the second data block is a first one of data blocks in the first data block set.

In one embodiment, the second data block is a last one of data blocks in the first data block set.

In one embodiment, the first data block set and the second data block set are both used for transmitting a same XR service.

In one embodiment, the first data block set and the second data block set are used for transmitting different services.

In one embodiment, the second information comprises information of the second data block set.

In one embodiment, the second information does not comprise information of the second data block set.

In one embodiment, the third information comprises information of the second data block set.

In one embodiment, the third information does not comprise information of the second data block set.

In one embodiment, the fourth information comprises information of the second data block set.

In one embodiment, the fourth information does not comprise information of the second data block set.

In one embodiment, the second information is used for configuring the first QoS flow.

In one embodiment, the third information is used for configuring the first QoS flow.

In one embodiment, the fourth information is used for configuring the first QoS flow.

In one embodiment, the second information comprises the first candidate identifier set.

In one embodiment, the third information comprises the first candidate identifier set.

In one embodiment, the fourth information comprises the first candidate identifier set.

In one embodiment, any candidate identifier in the first candidate identifier set is a QFI.

In one embodiment, the QoS parameter of the first QoS flow includes a first QFI.

In one embodiment, any candidate identifier in the first candidate identifier set is a sub-identifier of a first QFI.

In one embodiment, any candidate identifier in the first candidate identifier set is a spread-identifier of a first QFI.

In one embodiment, any candidate identifier in the first candidate identifier set is a quality of packet indicator (QPI).

In one embodiment, any candidate identifier in the first candidate identifier set is 5QI.

In one embodiment, any candidate identifier in the first candidate identifier set is a sub-identifier or a spread-identifier of 5QI.

Embodiment 7

Figures 7, 8:
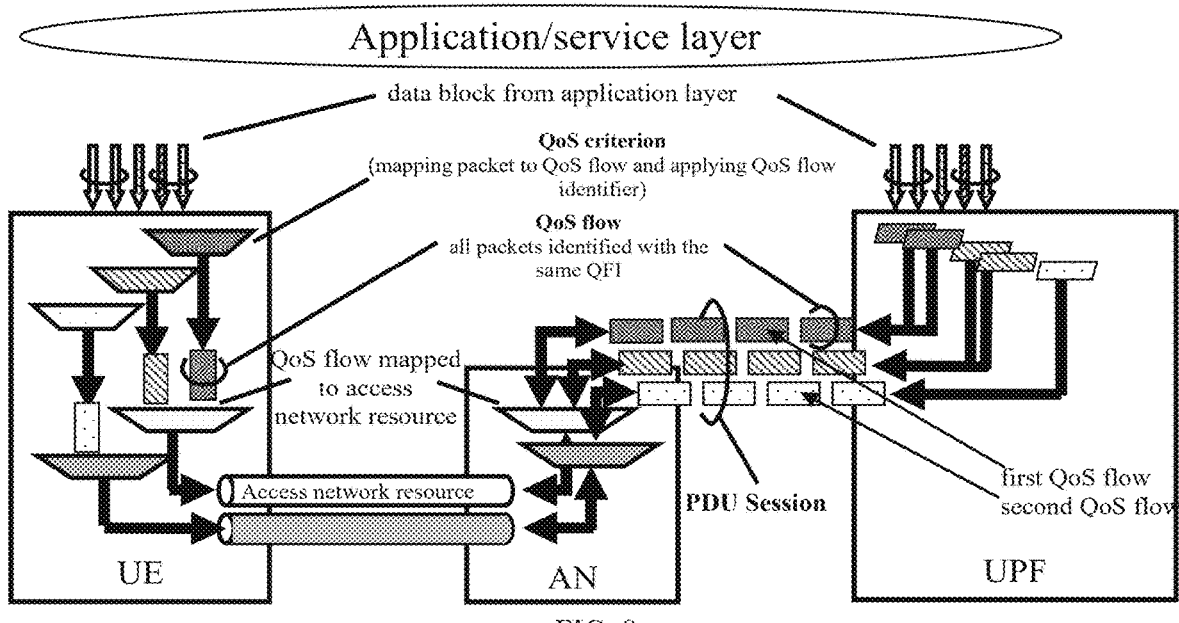
FIG. 7 illustrates a schematic diagram of a QoS parameter according to one embodiment of the present application.
FIG. 8 illustrates a schematic diagram of a QoS flow according to one embodiment of the present application.

Embodiment 7 illustrates a schematic diagram of a QoS parameter according to one embodiment of the present application, as shown in FIG. 7.

FIG. 7 illustrates a mapping relationship between an identity used for indicating quality and a QoS characteristic. The QoS characteristic includes resource type, default priority, PDB, packet error rate, default maximum data burst volume, and default averaging window size; the value of the identity used for indicating quality in FIG. 7 is a positive integer, for instance, between 1 and 9, but of course the value of the said identity can also be an integer greater than 9; the resource type includes Guaranteed Bit Rate (GBR) and Non-GBR; the default priority is identified by an integer, where the smaller value of the integer the higher priority; in the existing system, the PDB defines an acceptable maximum delay for a packet transmitted via an interface between a UE and a core network element, e.g., UPF, where PDBs for both uplink and downlink are identical, for a GBR-type QoS flow, if a packet is not successfully transmitted within a period provided in PDB, it will be counted as missing.

In one embodiment, the default averaging window size is used to indicate calculation of measurement values within a default averaging window.

In one embodiment, a QoS parameter of the first QoS flow comprises an identity used for indicating quality, such as 5QI.

In one subembodiment, a 5QI is linked with a group of QoS characteristics.

In one subembodiment, a 5QI has a one-to-one mapping relationship with a group of QoS characteristics.

In one subembodiment, the first QoS flow is only configured with one 5QI.

In one subembodiment, the first QoS flow is through one 5QI, and has only one group of QoS characteristics.

In one embodiment, all QoS characteristics are predefined, so the QoS characteristics themselves don't need to be transmitted between different network elements, which means that when a 5QI of a QoS flow is determined, a group of QoS characteristics uniquely corresponding to the 5QI are also determined.

In one subembodiment, values of features comprised in any group of QoS characteristics, including a default PDB or packet error rate shown in FIG. 7, are all pre-defined.

In one embodiment, a QoS parameter of the first QoS flow comprises an Allocation and Retention Priority (ARP).

In one subembodiment, the ARP comprised by the QoS parameter of the first QoS flow includes priority, preemption capability and vulnerability of preemption, used for determining whether the establishment/modification/switch of the first QoS flow are allowed in the case of limited resources.

In one embodiment, QoS information of the first datablock comprises at least one item in QoS characteristic of the first QoS flow.

In one subembodiment, the first QoS information is different from the value of a corresponding item in the QoS characteristic of the first QoS flow.

In one embodiment, the meaning of the delay requirement comprised in the QoS information of the first data block includes PDB.

In one embodiment, the QoS information of the first data block comprises a priority.

In one embodiment, the QoS information of the first data block comprises a resource type.

In one embodiment, the QoS information of the first data block comprises an averaging window size.

In one embodiment, a priority indicated by the QoS information of the first data block is higher than a priority comprised in the QoS characteristic of the first QoS flow.

In one embodiment, a priority indicated by the QoS information of the first data block is different from a priority comprised in the QoS characteristic of the first QoS flow.

In one embodiment, a priority indicated by the QoS information of the first data block is lower than a priority comprised in the QoS characteristic of the first QoS flow.

In one embodiment, a priority indicated by the QoS information of the first data block is different from a priority indicated by the QoS information of the second data block.

In one embodiment, a priority indicated by the QoS information of the first data block is determined by a priority comprised in the QoS characteristic of the first QoS flow and the first parameter set combined.

In one subembodiment, the first parameter set comprises an offset of a priority.

In one embodiment, a QoS parameter of the first data block set comprises an identity used for indicating quality.

In one embodiment, a QoS parameter of the first data block set comprises a 5QI.

In one embodiment, a QoS parameter of the first data block set comprises an ARP.

In one embodiment, the network indicates a QoS parameter of the first data block set.

In one embodiment, the core network indicates a QoS parameter of the first data block set.

In one embodiment, a first feature comprised in a QoS characteristic of the first data block set and a first feature comprised in a QoS characteristic of the first QoS flow have different values.

In one subembodiment, the first feature is a PDB.

In one subembodiment, the first feature is a priority.

In one subembodiment, the first feature is a packet error rate.

In one embodiment, the first feature comprised in QoS information of the second data block and the first feature comprised in the QoS information of the first data block have different values.

In one subembodiment, the network explicitly indicates a QoS characteristic of the first data block set.

In one subembodiment, the network explicitly indicates an index or an identity of a QoS characteristic of the first data block set.

In one subembodiment, the first node determines the QoS characteristic of the first data block set according to internal algorithm.

In one subembodiment, the first node determines the QoS characteristic of the first data block set according to whether relay is used.

In one subembodiment, the first node determines the QoS characteristic of the first data block set according to whether edge computing is used.

In one embodiment, QoS information of the first data block is determined by a QoS characteristic of the first data block set.

In one subembodiment, the delay requirement comprised in the QoS information of the first data block is equal to a PDB comprised in a QoS characteristic of the first data block set.

In one subembodiment, the delay requirement comprised in the QoS information of the first data block is equal to a delay requirement comprised in a QoS characteristic of the first data block set.

In one embodiment, a first feature comprised in a QoS characteristic of the first data block set and a first feature comprised in a QoS characteristic of the first QoS flow have the same value.

In one embodiment, the first parameter set comprises a QoS parameter of the first data block set.

In one embodiment, the first parameter set comprises a QoS characteristic of the first data block set.

In one embodiment, the first parameter set comprises at least one item in a QoS characteristic of the first data block set.

In one embodiment, the first parameter set comprises a PDB in a QoS characteristic of the first data block set.

In one embodiment, a delay requirement comprised in the QoS information of the first datablock is different from a delay requirement indicated by a QoS characteristic of the first data block set.

In one subembodiment, the delay requirement comprised in the QoS information of the first data block is determined by a delay requirement indicated by a QoS characteristic of the first datablock set and an offset determined by the first parameter set together.

In one subembodiment, the first parameter set comprises a difference between an arriving time of the first data block and an averaging arriving time of the first data block set, when the first parameter set comprises the arriving time of the first data block being earlier than the averaging arriving time of the first data block set, a delay requirement comprised in the QoS information of the first data block is looser than a delay requirement indicated by a QoS characteristic of the first data block set; when the first parameter set comprises the arriving time of the first data block being later than the averaging arriving time of the first data block set, a delay requirement comprised in the QoS information of the first data block is more stringent than a delay requirement indicated by a QoS characteristic of the first data block set.

In one embodiment, an averaging arriving time of the first data block set is an arithmetic mean of arriving times of all data blocks in the first data block set.

In one embodiment, an averaging arriving time of the first data block set is a median of arriving times of all data blocks in the first data block set.

Embodiment 8

Embodiment 8 illustrates a schematic diagram of a QoS flow according to one embodiment of the present application, as shown in FIG. 8.

FIG. 8 illustrates a transmission architecture based on QoS flow. In FIG. 8, the UE corresponds to the first node or the second node in the present application, the second node or the first node in the present application corresponds to a device in an access network in FIG. 8, where the access network in FIG. 8 corresponds to NR-RAN in Embodiment 2; the UPF in FIG. 8 corresponds to S-GW/UPF212 in Embodiment 2.

In one embodiment, the application/service layer in FIG. 8 belongs to the core network.

In one embodiment, the application/service layer in FIG. 8 belongs to the internet other than the core network.

In one embodiment, the first data block comprises data block(s) in an application/service layer.

In one embodiment, data blocks coming from an application/service layer are mapped onto corresponding QoS flows according to a pre-defined or network-configured QoS criterion, with identifiers of the QoS flows mapped being used.

In one subembodiment, the phrase "with identifiers of the QoS flows mapped being used" means that a PDU bearing the data from the application/service layer carries an identifier of a QoS flow being mapped.

In one subembodiment, the identifier of the QoS flow being mapped is used for identifying the related QoS flow mapped or indicating which one of the QoS flows the identifier belongs to.

In one subembodiment, the phrase "with identifiers of the QoS flows mapped being used" means that there exist mapping relationships between the network resource, channel, port and interface of a PDU bearing the data from the application/service layer and an identifier of a QoS flow being mapped.

In one embodiment, a packet or a PDU of a QoS flow is marked by a same QoS Flow Identifier (QFI).

In one embodiment, the first QoS flow is a flow between the UE and the UPF.

In one embodiment, the first QoS flow and the second QoS flow belong to a same PDU session.

In one embodiment, the access network resource in FIG. 8 comprises a radio bearer.

In one embodiment, the access network resource in FIG. 8 comprises an air interface resource.

In one embodiment, the access network resource in FIG. 8 comprises a time-frequency resource.

In one embodiment, the access network resource in FIG. 8 comprises a channel.

In one embodiment, the access network resource in FIG. 8 comprises a logical channel.

In one embodiment, the QoS information of the first data block is used for scheduling the first data block.

In one embodiment, the QoS information of the first data block is used for assigning access network resource to the first data block.

In one embodiment, the QoS information of the first data block is used for mapping the first data block to a corresponding access network resource.

In one embodiment, the method proposed in the present application is advantageous in that more targeted QoS requirements can be satisfied for service data.

Embodiment 9

Figure 9:
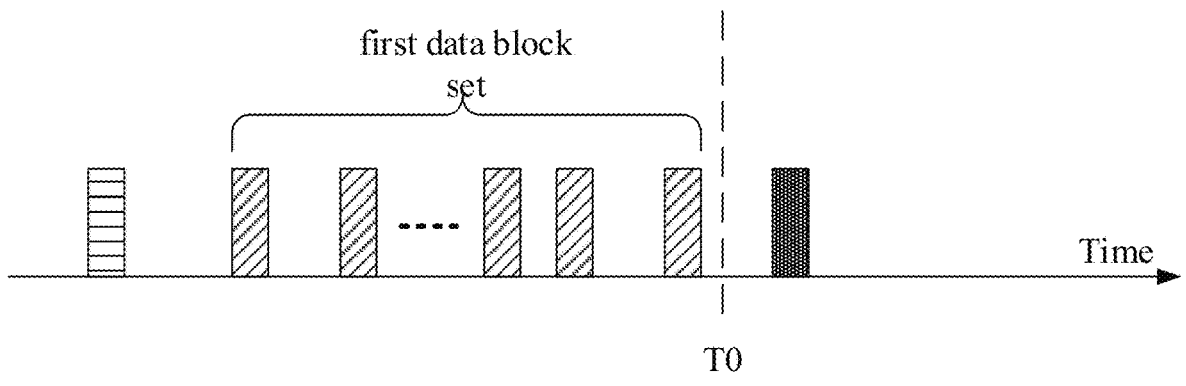
FIG. 9 illustrates a schematic diagram of a first data block set according to one embodiment of the present application.

Embodiment 9 illustrates a schematic diagram of a first data block set according to one embodiment of the present application, as shown in FIG. 9.

In one embodiment, the first data block set comprises at least two data blocks.

In one embodiment, the first data block set comprises a limited number of data blocks.

In one embodiment, the number of data blocks comprised in the first data block set is no greater than 1024.

In one embodiment, the number of data blocks comprised in the first data block set is no greater than 65.

In one embodiment, data blocks in the first data block set arrive sequentially in time domain.

In one embodiment, the times at which data blocks in the first data block set arrive in time domain are non-overlapping.

In one embodiment, the times at which data blocks in the first data block set are transmitted in time domain are non-overlapping.

In one embodiment, the times at which data blocks in the first data block set are transmitted in time domain are overlapping.

In one embodiment, data blocks in the first data block set are transmitted sequentially in time domain.

In one embodiment, data blocks in the first data block set are transmitted simultaneously in time domain.

In one embodiment, data blocks in the first data block set arrive within a first time window.

In one subembodiment, the first time window is predefined.

In one subembodiment, the first time window is configured by signaling.

In one subembodiment, the first time window is configured by the first node by itself.

In one subembodiment, the first time window is determined by a QoS parameter of the first data block set.

In one subembodiment, the first time window is determined by a QoS characteristic of the first data block set.

In one embodiment, data blocks in the first data block set are transmitted within a second time window.

In one subembodiment, the second time window is predefined.

In one subembodiment, the second time window is configured by signaling.

In one subembodiment, the second time window is configured by the first node by itself.

In one subembodiment, the second time window is determined by a QoS parameter of the first data block set.

In one subembodiment, the second time window is determined by a QoS characteristic of the first data block set.

In one embodiment, the first time window and the second time window are of a same length.

In one embodiment, the first time window is longer than the second time window.

In one embodiment, as shown in FIG. 9, T0 is a latest processing time that is allowable for the first data block set.

In one embodiment, as shown in FIG. 9, T0 is a latest time that is allowable for the first data block set to be transmitted.

In one embodiment, as shown in FIG. 9, T0 is a latest time that is allowable for the first data block set to be received by an application layer.

In one embodiment, the QoS information of the first data block comprises the T0.

In one embodiment, the third information indicates the T0.

In one embodiment, QoS information of any data block in the first data block set comprises the T0.

In one embodiment, QoS information of any data block in the first data block set can determine the T0.

In one embodiment, any data block that fails to be dealt with before T0 in the first data block set will be discarded.

In one embodiment, a delay requirement of the QoS information of the first data block comprises T0.

Embodiment 10

Figure 10:
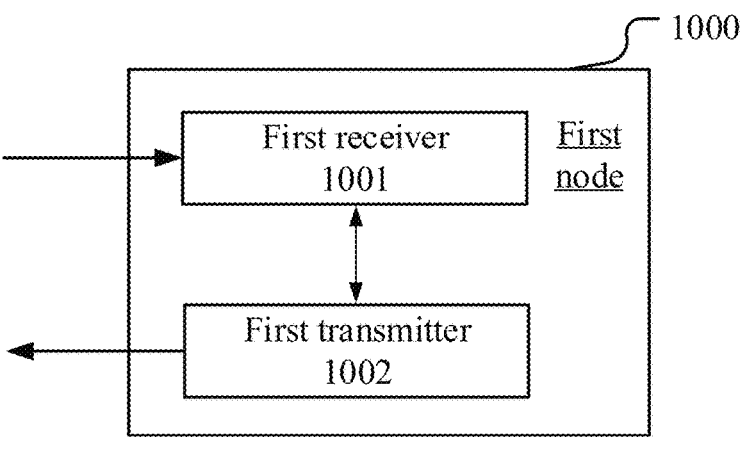
FIG. 10 illustrates a structure block diagram of a processing device in a first node according to one embodiment of the present application.

Embodiment 10 illustrates a structure block diagram of a processing device used in a first node according to one embodiment of the present application; as shown in FIG. 10. In FIG. 10, a processing device 1000 in the first node is comprised of a first receiver 1001 and a first transmitter 1002. In Embodiment 10, the first transmitter 1002 transmits a first data block; Quality of Service (QoS) information of the first data block being used for the action of transmitting a first data block;

herein, a first data block set comprises the first data block and a second data block; any data block comprised in the first data block set is linked with a first QoS flow; the QoS information of the first data block is different from QoS information of the second data block; the QoS information of the first data block comprises a delay requirement; the QoS information of the second data block comprises a delay requirement; any data block in the first data block set is generated by a same protocol layer.

In one embodiment, the first data block is generated by a PDCP layer or a protocol layer above the PDCP layer.

In one embodiment, the first transmitter 1002 transmits a second data block set, the second data block set comprising at least one data block, and the second data block set being linked with a second QoS flow; QoS information of any two data blocks in the second data block set are identical, and a QoS parameter of the second QoS flow is used to determine QoS information of any data block in the second data block set; any data block in the second data block set is generated by a same protocol layer.

In one embodiment, the first transmitter 1002 transmits first information, the first information being used to indicate that the first data block belongs to the first data block set.

In one embodiment, the first receiver 1001 receives second information, the second information being used to determine that the first data block belongs to the first data block set.

In one embodiment, a first parameter set is used to determine QoS information of the first data block.

In one embodiment, the first receiver 1001 receives third information, the third information being used to indicate at least one parameter in the first parameter set.

In one embodiment, the first parameter set comprises a QoS parameter of the first QoS flow.

In one embodiment, the first parameter set comprises a first parameter, the first parameter being neither a QoS parameter of the first QoS flow nor a QoS characteristic of the first QoS flow.

In one embodiment, the first parameter set comprises a number of data blocks comprised in the first data block set.

In one embodiment, the first parameter set comprises an arriving time of the first data block and an arriving time of the second data block.

In one embodiment, the first parameter set comprises first time information and second time information, the first time information and the second time information being respectively for the first data block and the second data block, and the first time information and the second time information being different.

In one embodiment, the first parameter set comprises QoS information of the second data block.

In one embodiment, the first receiver 1001 receives a first candidate identifier set, where each candidate identifier in the first candidate identifier set is linked with a delay requirement;

herein, the first parameter set comprises a candidate identifier in the first candidate identifier set.

In one embodiment, the QoS information of the first data block comprises a priority, and the QoS information of the second data block comprises a priority; the priority of the first data block and the priority of the second data block are different; the priority of one of the first data block and the second data block is equal to a priority indicated by a QoS parameter of the first QoS flow or by a QoS characteristic of the first QoS flow.

In one embodiment, the action of transmitting a first data block comprises: mapping the first data block to radio bearers (RBs) in a first radio bearer set according to the QoS information of the first data block; the first radio bearer set comprises at least two RBs.

In one embodiment, the first transmitter 1002 transmits a first measurement report, the first measurement report comprising a delay report of the first data block set, where QoS information of respective data blocks in the first data block set are used together for generating the delay report of the first data block set.

In one embodiment, the first receiver 1001 receives fourth information, the fourth information indicating that there exists dependency between the first data block and the second data block.

In one embodiment, the first node is a UE.

In one embodiment, the first node is a terminal supporting large delay difference.

In one embodiment, the first node is a terminal supporting NTN.

In one embodiment, the first node is an aircraft or vessel.

In one embodiment, the first node is a cellphone or vehicle-mounted terminal.

In one embodiment, the first node is a relay UE and/or a U2N remote UE.

In one embodiment, the first node is an IoT terminal or IIoT terminal.

In one embodiment, the first node is a piece of equipment supporting transmissions with low delay and high reliability.

In one embodiment, the first node is a sidelink communication node.

In one embodiment, the first node is a base station.

In one embodiment, the first node is a satellite.

In one embodiment, the first node is an access network device.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Figure 11:
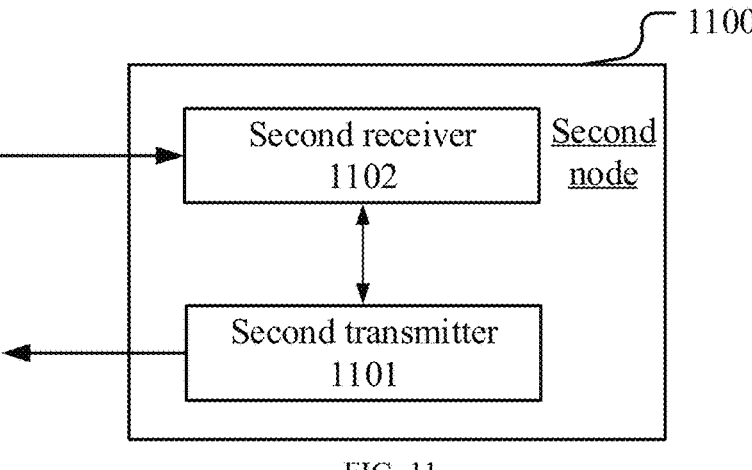
FIG. 11 illustrates a structure block diagram of a processing device in a second node according to one embodiment of the present application.

Embodiment 11 illustrates a structure block diagram of a processing device used in a second node according to one embodiment of the present application; as shown in FIG. 11. In FIG. 11, a processing device 1100 in the second node comprises a second receiver 1102 and a second transmitter 1101. In Embodiment 11, the second receiver 1102 receives a first data block; Quality of Service (QoS) information of the first data block being used for transmitting the first data block;

herein, a first data block set comprises the first data block and a second data block; any data block comprised in the first data block set is linked with a first QoS flow; the QoS information of the first data block is different from QoS information of the second datablock; the QoS information of the first datablock comprises a delay requirement; the QoS information of the second data block comprises a delay requirement; any data block in the first data block set is generated by a same protocol layer.

In one embodiment, the first data block is generated by a PDCP layer or a protocol layer above the PDCP layer.

In one embodiment, the second receiver 1102 receives a second data block set, the second data block set comprising at least one data block, and the second data block set being linked with a second QoS flow; QoS information of any two data blocks in the second data block set are identical, and a QoS parameter of the second QoS flow is used to determine QoS information of any data block in the second data block set; any data block in the second data block set is generated by a same protocol layer.

In one embodiment, the second receiver 1102 receives first information, the first information being used to indicate that the first data block belongs to the first data block set.

In one embodiment, the second transmitter 1101 transmits second information, the second information being used to determine that the first data block belongs to the first data block set.

In one embodiment, a first parameter set is used to determine QoS information of the first data block.

In one embodiment, the second transmitter 1101 transmits third information, the third information being used to indicate at least one parameter in the first parameter set.

In one embodiment, the first parameter set comprises a QoS parameter of the first QoS flow.

In one embodiment, the first parameter set comprises a first parameter, the first parameter being neither a QoS parameter of the first QoS flow nor a QoS characteristic of the first QoS flow.

In one embodiment, the first parameter set comprises a number of data blocks comprised in the first data block set.

In one embodiment, the first parameter set comprises an arriving time of the first data block and an arriving time of the second data block.

In one embodiment, the first parameter set comprises first time information and second time information, the first time information and second time information being respectively for the first data block and the second data block, and the first time information and the second time information being different.

In one embodiment, the first parameter set comprises QoS information of the second data block.

In one embodiment, receiving a first candidate identifier set, where each candidate identifier in the first candidate identifier set is linked with a delay requirement;

herein, the first parameter set comprises a candidate identifier in the first candidate identifier set.

In one embodiment, the QoS information of the first data block comprises a priority, and the QoS information of the second data block comprises a priority; the priority of the first data block and the priority of the second data block are different; the priority of one of the first data block and the second data block is equal to a priority indicated by a QoS parameter of the first QoS flow or by a QoS characteristic of the first QoS flow.

In one embodiment, the second receiver 1102 receives a first measurement report, the first measurement report comprising a delay report of the first data block set, where QoS information of respective data blocks in the first data block set are used together for generating the delay report of the first data block set.

In one embodiment, the second transmitter 1101 transmits fourth information, the fourth information indicating that there exists dependency between the first data block and the second data block.

In one embodiment, the second node is a satellite.

In one embodiment, the second node is a U2N relay UE.

In one embodiment, the second node is an IoT node.

In one embodiment, the second node is a wearable node.

In one embodiment, the second node is a base station.

In one embodiment, the second node is a relay.

In one embodiment, the second node is an access point.

In one embodiment, the second node is a multicast-supporting node.

In one embodiment, the second node is a UE.

In one embodiment, the second node is a terminal.

In one embodiment, the second node is a cellphone.

In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IoT), RFID terminals, NB-IoT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE), comprising:
a transmitter configured to transmit a first data block set comprising a first data block and a second data block associated with a first Quality of Service (QoS) flow, wherein the first data block is associated with first QoS information and the second data block is associated with second QoS information that is different from the first QoS information,
wherein:
the first QoS information and the second QoS information each include a delay requirement,
the first QoS information is determined based on a number of data blocks included in the first data block set, and
the first data block and the second data block are generated by the same protocol layer.

2. The UE according to claim 1, wherein the first data block is generated by a Packet Data Convergence Protocol (PDCP) layer or a protocol layer that is higher than the PDCP layer.

3. The UE according to claim 2, wherein:
the transmitter is configured to transmit a second data block set comprising at least one data block associated with a second QoS flow, wherein QoS information associated with any two data blocks in the second data block set are identical and determined based on a QoS parameter of the second QoS flow.

4. The UE according to claim 2, wherein:
the transmitter is further configured to transmit first information indicating that the first data block is associated with the first data block set.

5. The UE according to claim 2, further comprising:
a receiver configured to receive second information indicating that the first data block is associated with the first data block set.

6. The UE according to claim 2, wherein the first QoS information is further determined based on a first parameter that is not a QoS parameter or a QoS feature of the first QoS flow.

7. The UE according to claim 2, wherein the first QoS information is further determined based on an arrival time of the first data block or the second data block.

8. The UE according to claim 2, wherein the first QoS information and the second QoS information each indicate a priority.

9. The UE according to claim 2, wherein the first QoS information is determined based on timing information of the first data block and timing information of the second data block.

10. The UE according to claim 2, wherein:
the UE further comprises a receiver configured to receive a first candidate identifier set having a plurality of candidate identifiers that are each linked with a candidate delay requirement,
the first QoS information is based on a candidate identifier of the first candidate identifier set, and
the first QoS information indicates a first priority, the second QoS information indicates a second priority that is different from the first priority, and
the first priority or the second priority is the same as a priority indicated by a QoS parameter or a QoS feature of the first QoS flow.

11. The UE according to claim 2, wherein the UE is further configured to map the first packet to radio bearers (RBs) in a first radio bearer set according to the first QoS information, wherein the first radio bearer set includes at least two RBs.

12. The UE according to claim 2, wherein the transmitter is further configured to transmit a first measurement report including a delay report of the first data block that is based on QoS information of packets associated with the first QoS flow.

13. The UE according to claim 2, further comprising:
a receiver configured to receive information indicating a dependency between the first data block and the second data block.

14. The UE according to claim 13, wherein the first QoS information and the second QoS information each indicate a priority.

15. The UE according to claim 11, wherein the first QoS information and the second QoS information each indicate a priority.

16. The UE according to claim 11, wherein:
the transmitter is further configured to transmit at least one data block associated a second QoS flow, and QoS information of any two packets associated with the second QoS flow are identical and determined based on a QoS parameter of the second QoS flow.

17. The UE according to claim 3, further comprising:
a receiver configured to receive information indicating a dependency between the first data block and the second data block.

18. A base station, comprising:
a receiver configured to receive a first data block set comprising a first data block and a second data block associated with a first Quality of Service (QoS) flow, wherein the first data block is associated with first QoS information and the second data block is associated with second QoS information that is different from the first QoS information,
wherein:
the first QoS information and the second QoS information each include a delay requirement,
the first QoS information is based on a number of data blocks included in the first data block set, and
the first data block and the second data block are generated by the same protocol layer.

19. A method, comprising:
transmitting a first data block set comprising a first data block and a second data block associated with a first Quality of Service (QoS) flow, wherein the first data block is associated with first QoS information that is different from the first QoS information, wherein:

the first QoS information and the second QoS information each include a delay requirement, the first QoS information is based on a number of data blocks included in the first data block set, and the first data block and the second data block are generated by the same protocol layer.

\* \* \* \* \*